United States Patent [19]
Wood

[11] Patent Number: 4,879,763
[45] Date of Patent: Nov. 7, 1989

[54] OPTICAL FIBER BIDIRECTIONAL TRANSMISSION SYSTEM

[75] Inventor: Thomas H. Wood, Highlands, N.J.

[73] Assignee: AT&T Bell laboratories American Telephone and Telegraph Company, New York, N.Y.

[21] Appl. No.: 832,153

[22] Filed: Feb. 21, 1986

[51] Int. Cl.⁴ .............................................. H04B 9/00
[52] U.S. Cl. .................................. 455/607; 370/3; 455/605; 455/612
[58] Field of Search ............... 455/605, 607, 606, 609, 455/610, 611, 612, 617; 370/3

[56] References Cited

U.S. PATENT DOCUMENTS

| | | | |
|---|---|---|---|
| 3,989,942 | 11/1976 | Waddoups | 455/605 |
| 4,168,427 | 9/1979 | Hubbard | 455/612 |
| 4,357,713 | 11/1982 | Blackburn et al. | 455/613 |
| 4,525,687 | 6/1985 | Chemla et al. | 350/355 |
| 4,570,062 | 2/1986 | Tsumura et al. | 455/605 |
| 4,658,394 | 4/1987 | Cheng et al. | 455/605 |
| 4,662,003 | 4/1987 | Eichweber | 455/605 |
| 4,739,521 | 4/1988 | Akimoto | 455/612 |

FOREIGN PATENT DOCUMENTS

| | | | |
|---|---|---|---|
| 2558025 | 7/1985 | France | 370/3 |
| 0194632 | 11/1985 | Japan | 455/605 |
| 60-237736 | 11/1985 | Japan | 370/3 |

Primary Examiner—Robert L. Griffin
Assistant Examiner—L. Van Beek
Attorney, Agent, or Firm—Richard D. Laumann; Gregory C. Ranieri

[57] ABSTRACT

A bidirectional optical communications system is described using a multiple quantum well structure as both a photodetector and light modulator.

10 Claims, 3 Drawing Sheets

OPTICAL FIBER BIDIRECTIONAL TRANSMISSION SYSTEM

TECHNICAL FIELD

This invention relates generally to optical communication systems using optical fibers and particularly to such systems which are bidirectional.

BACKGROUND OF THE INVENTION

Typical present day optical communication systems use a glass transmission line, termed an optical fiber, to transmit an optical signal between a light source and a photodetector. For many applications, transmission of information in both directions is desired. Such systems are commonly termed bidirectional and often use two separate unidirectional transmission systems. That is, they use two optical fibers, two light sources and two photodetectors.

This configuration is frequently commercially undesirable because the added components, as compared to a unidirectional system, increase the cost of the system. Not only are two optical fibers required, but the light sources are typically semiconductor lasers which are relatively expensive at the present time. Additionally, many sites for at least one of the lasers would necessarily be on customer premises and might encounter hostile environments thereby degrading system performance. Accordingly, effort has been devoted to developing a bidirectional optical communications system architecture using fewer components.

For example, a bidirectional system has been demonstrated which uses a single optical fiber connecting the two users, i.e., terminals. A laser and photodetector are placed at one system terminal and a laser and photodetector are also placed at the other system terminal. The latter terminal will be termed the user site. While this architecture is perfectly adequate for many purposes, it is disadvantageous because it requires both a photodetector and a laser at both terminals. A system using still fewer components would be desirable.

SUMMARY OF THE INVENTION

I have found that a bidirectional optical fiber communications system may be implemented using a first terminal comprising a light source and first photodetector; a second terminal comprising a modulator, second photodetector, and means for reflecting incoming light through said modulator; and an optical fiber optically connecting the first terminal to the second terminal. The modulator changes the intensity of the reflected light which is received by the first photodetector. In a preferred embodiment, the modulator and photodetector functions are performed by a device such as a multiple quantum well structure. This configuration is advantageous because the multiple quantum well (MQW) structure may be used as both the photodetector and modulator. The MQW structure may be used in a mode in which it is not sensitive to polarization and thus, polarization control is unnecessary. The optical fiber is desirably a single mode fiber. In a further preferred embodiment, the light source is modulated at a high frequency to eliminate interference between the Rayleigh backscattered and relfected waves. This improves the signal to noise ratio as it has been found that it reduces the Rayleigh noise resulting from the superposition of the two light paths.

BRIEF DESCRIPTION OF THE DRAWINGS

Identical numerals are used to indicate identical elements in the several figures. The elements are not drawn to scale for reasons of clarity.

DETAILED DESCRIPTION

Figure 1:
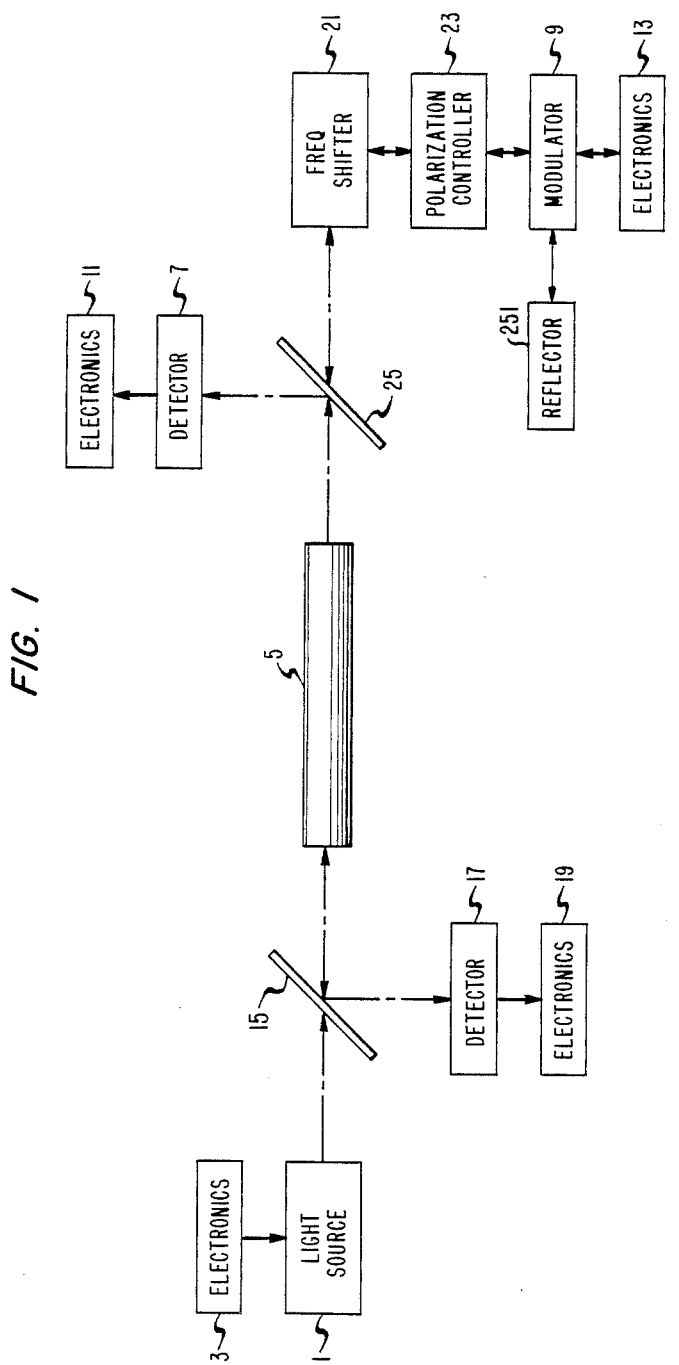
FIG. 1 is a schematic representation of one embodiment of a bidirectional optical communications system according to this invention.

An exemplary embodiment of a communications system according to this invention is schematically depicted in FIG. 1. Depicted is a light source 1 which is, for example, a laser. Also shown is the laser driver 3 which includes the well known electronics necessary to modulate the laser. There is an optical fiber 5 which is between the light source and detector 7 and modulator 9. Also shown are the well known electronics 11 and 13 for the photodetector and modulator, respectively. Between the fiber and the laser is first beam splitter 15 which directs light from the modulator to photodetector 17. Connected to photodetector 17 is electronics 19. The details of the electronics for the laser driver, modulator, and detectors are now well known to those skilled in the art and need not be described in further detail. The photodetector may be any conventional photodetector such as an avalanche photodetector. Also depicted are frequency shifter 21 and polarization controller 23. Second beam splitter 25 is between the fiber and the modulator and photodetector. The fiber thus optically connects first and second terminals which comprise the elements to the left and right, respectively, of the fiber. For reasons of clarity, the terms modulator, light source and photodetector will be used to include the associated electronics.

The modulator, which desirably comprises means for reflecting light 251, varies the intensity of the relfected light. Thus, the system depicted requires only a single light source for bidirectional transmission of information. The light source operates when information is transmitted from the second to the first terminal.

If desired, lenses (not shown) may be used to focus the light from the fiber onto the modulator; into the fiber from the source; and also from the first beam splitter onto the photodetector. The beam splitters may be any conventional beam splitters. For example, fiber optic directional couplers may be used. This is preferred because of small size. The fiber is desirably a single mode fiber because it supports higher data rates than do multimode fibers and eliminates modal noise.

The modulator may be one of several types. Multiple quantum well, Group III-V semiconductor electroabsorption, and lithium niobate modulators are contemplated. The first type, described in U.S. Pat. No. 4,525,687, is preferred.

Frequency shifters and polarization controllers are well known to those skilled in the art and need not be described in detail. Use of, for example, acousto-optic frequency shifters is contemplated.

Figure 2:
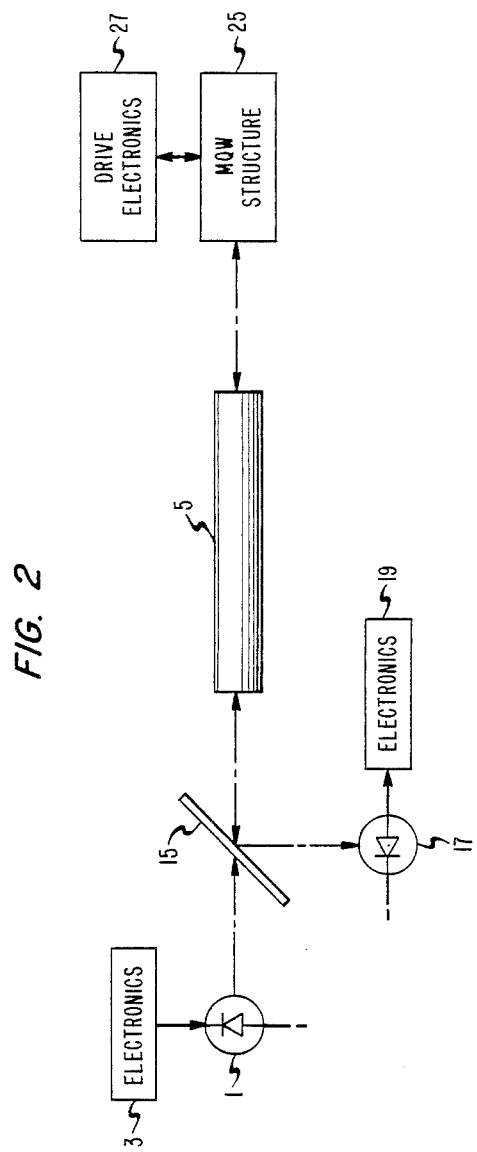
FIG. 2 is a schematic representation of another embodiment of this invention.

In a preferred embodiment, the modulator and photodetector functions at the second terminal are combined in a single structure 25 as shown in FIG. 2. The structure is a multiple quantum well structure. Alternatively, the structure may be a bulk Group III-V electroabsorption modulator which also functions as a photodetector. The electronics are shown as drive electronics 27. The structure and operation of such MQW devices is well known to those skilled in the art and need not be described in exhaustive detail. However, it is preferred that the mirror be placed at the bottom of the MQW structure for reflection. This eliminates the need for a separate mirror and will, of course, facilitate alignment. It will be readily appreciated that the operating voltages for the receiver and modulator functions, typically 7 μV and 7 V, respectively differ significantly. Accordingly, care should be taken to isolate the circuits.

When the multiquantum well modulator was used at 50 megabit/sec, there was a large noise level observed which made reasonable reception of the bit pattern difficult, if not impossible. This noise, which is believed to be previously both unobserved and unanticipated, was determined to arise from coherent interference of the light from the modulator and the Rayleigh backscattered light. This noise will be termed coherent Rayleigh noise and is believed common to all systems using this architecture regardless of the type of modulator. It was found, however, that the coherent Rayleigh noise could be reduced by application of a small dither signal to the laser, i.e., source. This dither signal should have a frequency at least equal to the reciprocal of the coherence time of the source. The dither signal may have a frequency higher than that of the data rate. An electronic filter may then be used at the receiver to remove the dither signal prior to signal detection and processing. That is, the filter is part of electronics 19.

With a 100 MHz modulation applied, a bit error rate of $1 \times 10^{-9}$ was obtained at 50 megabit/sec. When the multiquantum well structure is used as a photodetector, a bit error rate of $2 \times 10^{-10}$ was obtained at 600 megabit/sec. The speed was limited by the response speed of the modulator when used in the photodetector mode.

Alternatively, it is believed that the polarization controller may be used to make the polarizations of the sent and reflected waves perpendicular at the first photodetector, i.e., first terminal, to eliminate the coherent Rayleigh noise. Of course, the polarization controller is also used when the modulator is polarization sensitive. Additionally, the frequency shifter may be used to reduce the coherent Rayleigh noise. The dither signal, polarization controller and frequency shifter are means for reducing coherent Rayleigh noise.

Figure 3:
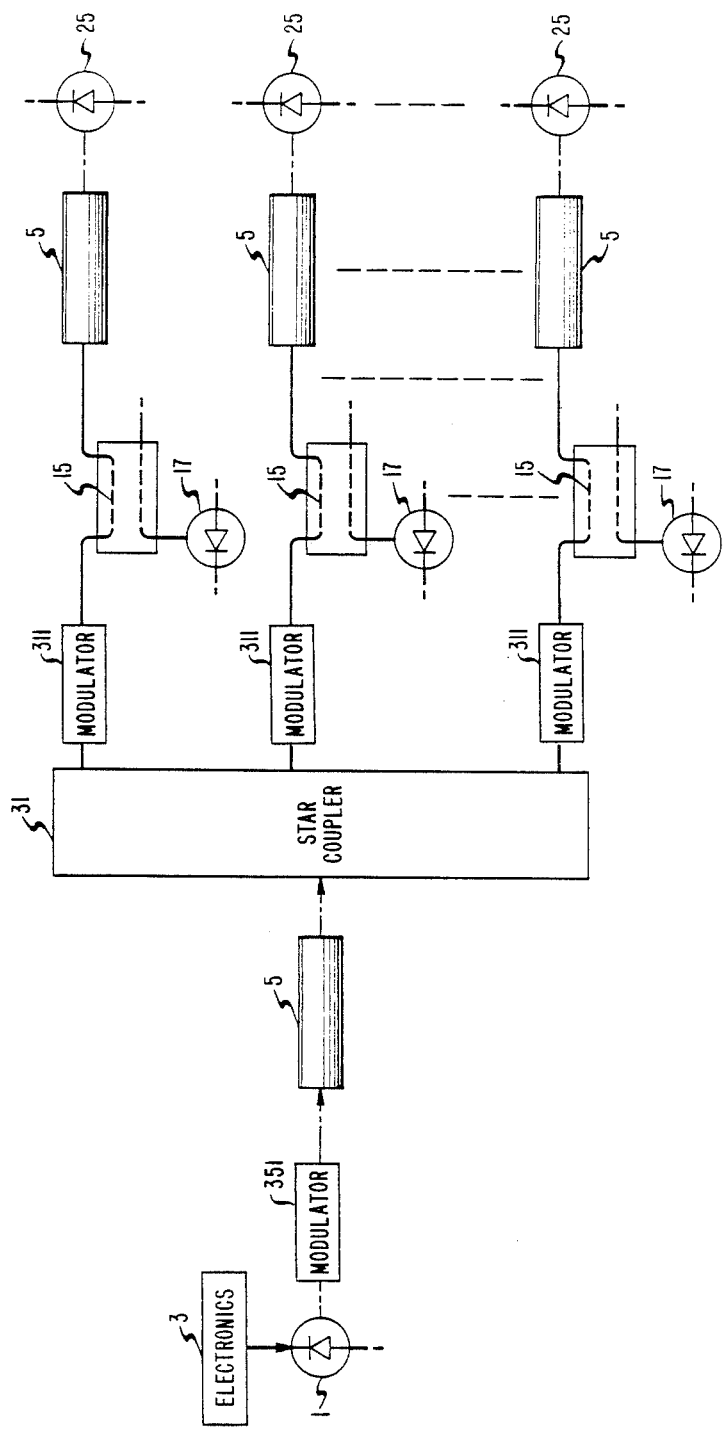
FIG. 3 is a schematic representation of yet another embodiment of this invention.

Still other embodiments are contemplated. One embodiment is depicted in FIG. 3 and uses an n-output star coupler 30 to divide light from the single light source 1 into a plurality of fibers 5. All fibers are not explicitly shown but are indicated by the dots. If desired, modulators 311 may be present between the star coupler and the fibers so that each channel may be individually modulated at the source end. Alternatively, the light source 1 may be modulated by modulator 351 when it is desired to transmit identical information.

Additionally, the first terminal may further include an optical isolator to prevent light from being reflected into the laser.

What is claimed is:

1. An optical communication system comprising a first terminal, a second terminal, and an optical fiber for optically connecting said first terminal to said second terminal;
    said first terminal comprising a light source for generating optical signals to be launched into said optical fiber and a first photodetector for receiving optical signals from said optical fiber;
    said second terminal comprising a second photodetector for receiving optical signals from said optical fiber, means for modulating optical signals from a reflector means to be launched into said optical fiber, and said reflector means for reflecting optical signals received from said light source via said means for modulating back into said means for modulating; and
    at least one of said terminals comprises means for performing a predetermined translation of said optical signals to be launched into said optical fiber to reduce coherent Rayleigh noise.

2. A system as recited in claim 1 in which said second photodetector and modulator comprise a single multiple quantum well structure or a bulk Group III–V semiconductor structure.

3. A system as recited in claim 1 in which said means for performing comprises means for applying a dither signal to said light source for varying said optical signal, said dither signal having a frequency at least equal to reciprocal of the coherence time of said light source 4. A system as recited in claim 1 in which said means for performing comprises means for shifting frequency components of optical signals from said means for modulating, said means for shifting optically coupled between said optical fiber and said means for modulating.

5. A system as recited in claim 1 in which said second terminal further comprises means for controlling polarization of optical signals, said means for controlling polarization optically connected between said optical fiber and said means for modulating.

6. A system as recited in claim 1 in which said light source comprises a semiconductor laser.

7. A system as recited in claim 6 in which said first terminal further comprises a star coupler optically connected between said light source and said optical fiber.

8. A system as recited in claim 7 further comprising a plurality of second terminals and a plurality of optical fibers, said plurality of fibers connecting said plurality of second terminals to said star coupler on a one-to-one basis.

9. A system as recited in claim 8 in which said first terminal further comprises at least first means for modulating an optical signal, said at least first means for modulating connected between said light source and said star coupler.

10. A system as recited in claim 8 in which said first terminal further comprises a plurality of optical modulators said plurality of optical modulators connected to said star coupler via said plurality of optical fibers on a one-to-one basis.

* * * * *